United States Patent [19]

Tsuchiya et al.

[11] Patent Number: 5,737,753

[45] Date of Patent: Apr. 7, 1998

[54] LEAST RECENTLY USED BLOCK REPLACEMENT FOR FOUR BLOCK CACHE LOGIC SYSTEM

[75] Inventors: Kenichi Tsuchiya, New Brighton, Minn.; Thomas John Adelmeyer, Hillsboro, Oreg.

[73] Assignee: Unisys Corporation, Blue Bell, Pa.

[21] Appl. No.: 520,442

[22] Filed: Aug. 29, 1995

Related U.S. Application Data

[63] Continuation of Ser. No. 881,915, May 12, 1992, abandoned.

[51] Int. Cl.[6] .................................................. G06F 13/00
[52] U.S. Cl. ............................................................ 711/136
[58] Field of Search ................................. 395/455, 463, 395/487; 711/128, 136, 160

[56] References Cited

U.S. PATENT DOCUMENTS

| | | | |
|---|---|---|---|
| 4,168,541 | 9/1979 | Dekarske | 365/230 |
| 4,464,217 | 8/1984 | Keeley et al. | 395/449 |
| 4,686,621 | 8/1987 | Keeley et al. | 364/200 |
| 4,794,521 | 12/1988 | Ziegler et al. | 364/200 |
| 4,891,809 | 1/1990 | Hazawa | 371/3 |
| 4,945,512 | 7/1990 | Dekarske et al. | 365/49 |
| 4,967,414 | 10/1990 | Lusich et al. | 371/51.1 |
| 4,985,825 | 1/1991 | Webb, Jr. et al. | 395/496 |
| 5,019,971 | 5/1991 | Lefsky et al. | 364/200 |
| 5,043,943 | 8/1991 | Crisp et al. | 365/189.01 |
| 5,146,603 | 9/1992 | Frost et al. | 395/470 |
| 5,179,675 | 1/1993 | Cole et al. | 395/403 |
| 5,255,384 | 10/1993 | Sachs et al. | 395/417 |
| 5,276,848 | 1/1994 | Gauagher et al. | 395/425 |
| 5,333,296 | 7/1994 | Bouchard et al. | 395/425 |
| 5,349,651 | 9/1994 | Hetherington et al. | 395/417 |

*Primary Examiner*—David L. Robertson
*Attorney, Agent, or Firm*—John B. Sowell, Esq.; Mark T. Starr, Esq.; Charles A. Johnson, Esq.

[57] ABSTRACT

In a high speed main frame computer system, a high speed instruction processor is provided with a high speed cache memory. The cache memory is provided with a plurality of associated memories including a tag memory. Every time the instruction processor attempts to access the cache memory, a cache set address is generated which accesses the associated memories to provide most recently used (MRU) block information, validity information and degrade block information. The accessed information is applied as inputs to a cache logic system. The cache logic system logically modifies the information to generate an update of the MRU information and writes the modified MRU information into the MRU associated memory at the set address without control or supervision on the part of the instruction processor. The cache logic system also generates the least recently used (LRU) block coded information using the MRU information, validity information and degraded block information for cache block replacement.

13 Claims, 7 Drawing Sheets

LEAST RECENTLY USED BLOCK REPLACEMENT FOR FOUR BLOCK CACHE LOGIC SYSTEM

This is a continuation of application Ser. No. 07/881,915 filed on May 12, 1992 now abandoned.

BACKGROUND OF THE INVENTION

1. Field of the Invention

The present invention relates to high speed instruction processor (IP) cache memories used in high speed mainframe computers. More particularly, the present invention relates to logic circuitry that identifies without error the least recently used (LRU) block in an instruction processor cache memory and/or identifies any invalid or degraded blocks in the instruction processor cache memory for block replacement.

2. Description of the Prior Art

The present invention is an improvement of our U.S. Pat. No. 4,168,541 which shows and describes a "paired least recently used (LRU) block replacement system". This patent employs a three bit code to identify a pair of blocks in cache memory that was least recently used. The first bit of the three bit code is employed to identify one of the two possible pairs of blocks (AB or CD) which contains either the least recently used block OR one of the two least recently used blocks. This three bit logic code cannot select without statistical error the one block of the four blocks of a cache memory that was the least recently used block. However, it can be shown that this complex logic circuitry does select most of the time the pair of blocks which contains the least recently used block. The last two bits of the three bit code is used to identify within the selected pair AB or CD which of the two blocks A or B is the least recently used block. It can be shown statistically that replacing the least recently used (LRU) block in cache memory every time rather than replacing the second least recently used block in cache memory will improve the hit rate which in turn will result in an enhanced speed of operation of the instruction processor and the computing system.

The above mentioned U.S. Patent does not prevent writing into an already degraded block area of cache memory which will create an additional miss when subsequently referenced by the instruction processor.

It would be highly desirable to provide a simplified logic circuitry for a high speed cache memory of a high speed instruction processor which would reduce misses to a statistical minimum.

SUMMARY OF THE INVENTION

It is a primary object of the present invention to reduce the miss rate of an instruction processor referencing a cache memory to a statistical minimum.

It is another principal object of the present invention to identify and encode without statistical error the least recently used block of a set associative address of a cache memory of a high speed instruction processor.

It is another primary object of the present invention to identify without statistical error an invalidated block or blocks of a set associated address of a cache memory for block replacement.

It is another principal object of the present invention to identify without statistical error the degraded blocks or blocks of a set associative address of a cache memory so that the degraded block(s) will not be used for block replacement.

It is another principal object of the present invention to provide a novel and simplified logic circuit that is used to minimize the number of misses of an instruction processor cache memory while minimizing the degradation of the instruction processor's performance.

According to these and other objects of the present invention there is provided a most recently used information memory which stores in encoded five bit binary format each of the six possible combination of pairs of blocks for a four block set associative cache memory. The logic circuitry employs two of its five bits of the code to identify the most recently used block and employs the remaining three bits to encode information concerning the three pairs of blocks that do not contain the most recently used (MRU) block. The encoded five bits of LRU/MRU information is stored at the set associative address of the cache memory in a read-modify-write mode of operation so that the next reference to the set associative address of the cache memory contains all of the information necessary to derive least recently used information for block replacement if the IP cache memory reference is a miss.

DETAILED DESCRIPTION OF THE PREFERRED EMBODIMENT

Figure 1:
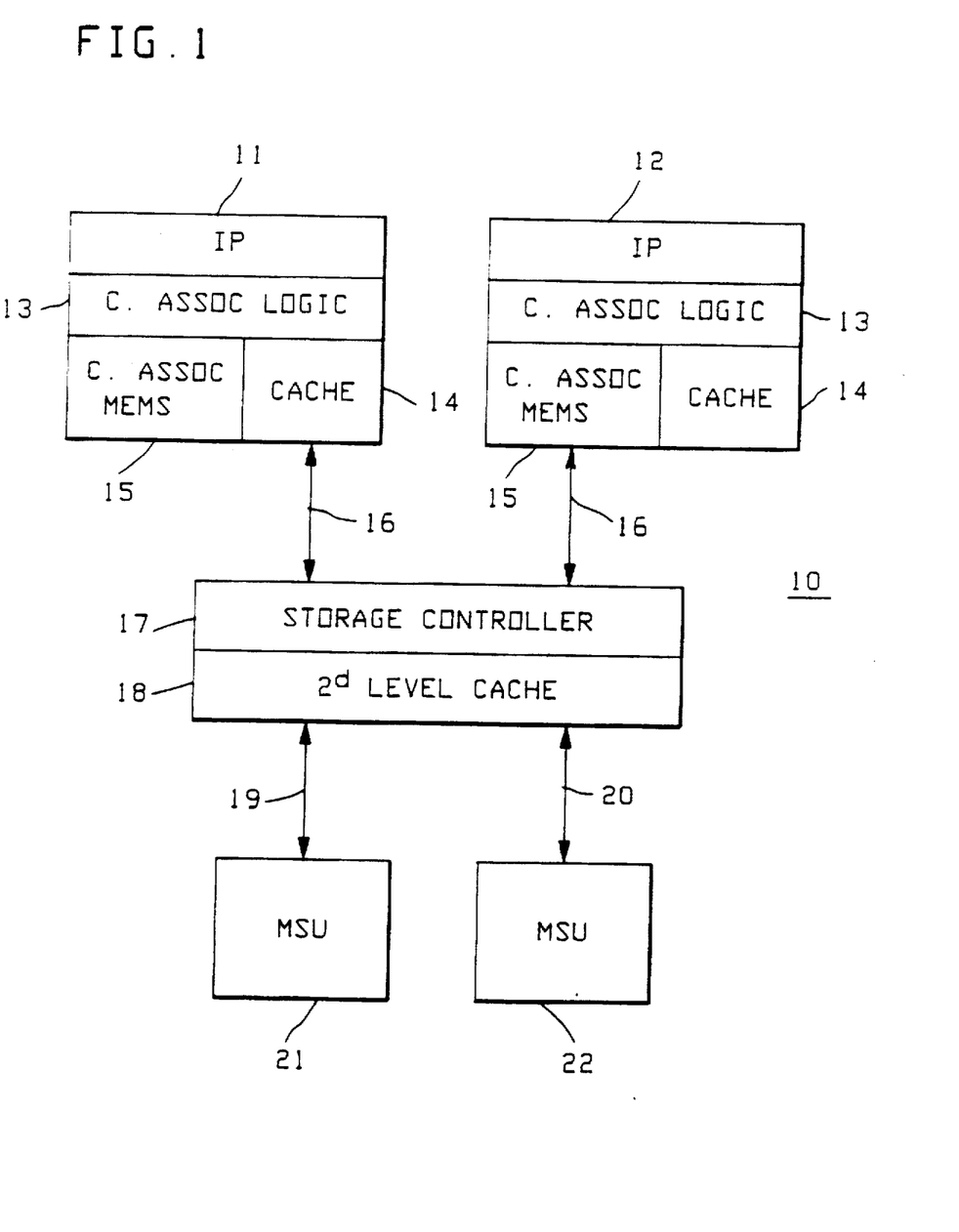
FIG. 1 is a schematic diagram of two instruction processors their novel cache associated logic and their associated main storage units in a multiple processor high speed mainframe computing system.

Refer now to FIG. 1 showing a simplified schematic diagram of two instruction processors (IPs) 11, 12 coupled through a storage controller to their main storage units. The system 10 comprises IPs 11 and 12 each of which is shown having a cache associative logic 13 coupled to a cache memory 14 and its cache associated memories 15. A multiple line cable 16 is bidirectionally coupled to a storage controller 17 which preferably contains a second level cache memory 18 which in turn is coupled via cables 19, 20 to main storage units (MSUs) 21 and 22.

In a preferred mode of operation the instruction processor 11 will attempt to reference its cache memory 14 using an address generated by the instruction processor. If the cache memory contains the requested block or blocks of information and the block or blocks requested are not degraded or invalidated, the instruction processor is able to access the cache memory resulting in a perfect hit. At the same time the cache associated logic generates information which is stored in the cache associated memory 15 that updates the aging information which will be explained in more detail hereinafter.

If the same IP 11 attempts to reference the cache memory 14 at an address which is not resident in the cache memory, a miss occurs which is detected by the storage controller 17 which in turn first searches the second level cache memory 18 to determine if the missing block is contained therein. If the missing block is contained in the second level cache memory, it is immediately sent to the IP cache memory 14 replacing the least recently used block. Since the instruction processor requires the command or data necessary to carry out the current instruction, the instruction processor must wait for the necessary command or data as the case may be, therefore it is imperative that necessary information be supplied to the cache memory 14 without generating conditions which would cause a subsequent miss. If the block or blocks of information referenced by the instruction processor are not in the second level cache memory 18, then the storage controller 17 must fetch the desired block or blocks of information from one of the associated MSU's 21 or 22. The instruction processor 11 is again placed in a wait state, thus it will be appreciated that it is important to minimize the number of misses and to statistically provide the blocks of information in cache memory 14 which maximize the hit rate.

Figure 2:
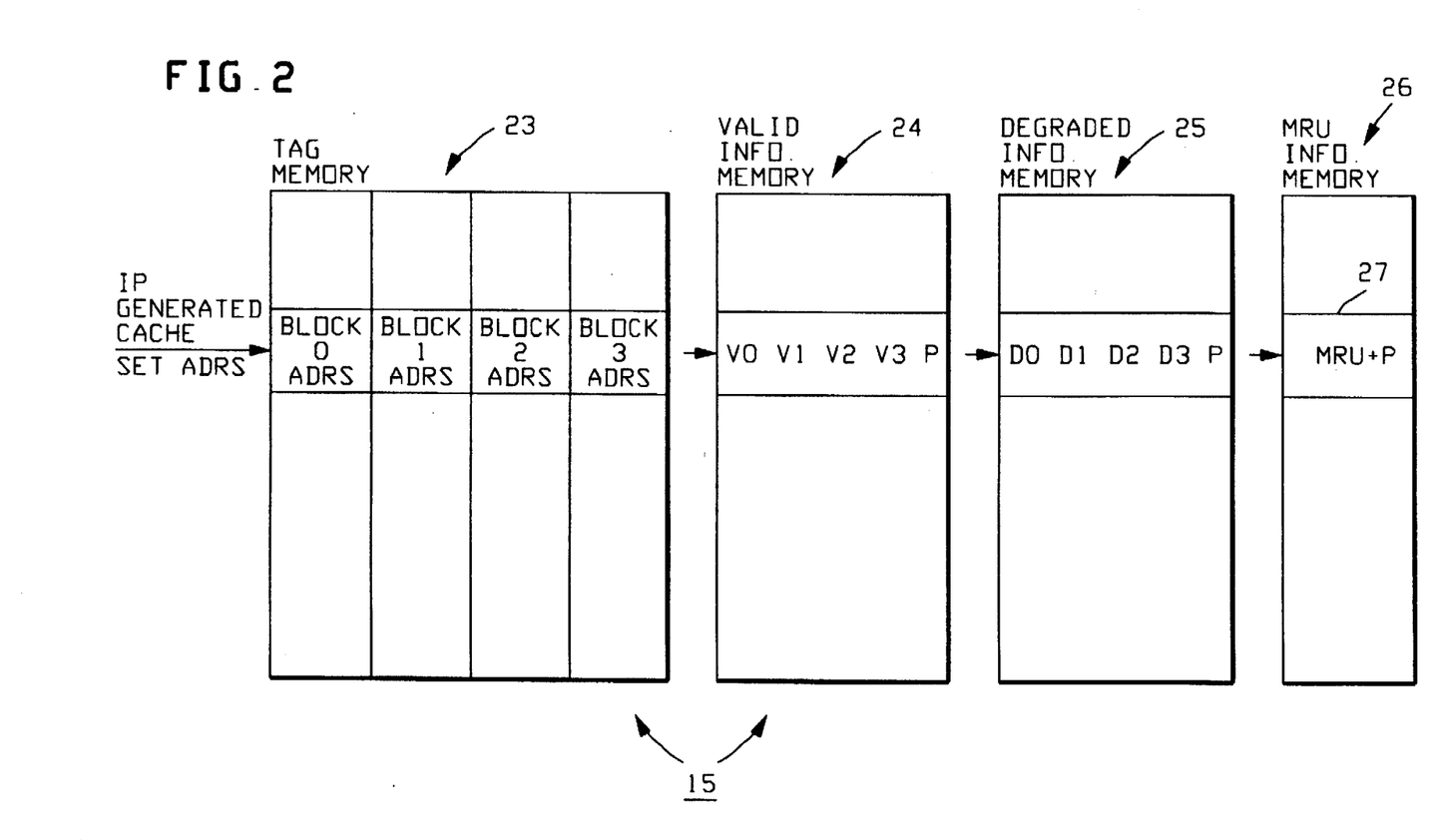
FIG. 2 is a schematic diagram of the novel IP cache associated memories shown in FIG. 1.

Refer now to FIG. 2 showing in schematic diagram format the cache associated memories 15 which comprise a tag memory 23, a valid information memory 24, a degraded information memory 25 and a most recently used information memory 26. When the IP 11 attempts to reference the cache memory 14, the IP generates a primary cache set associative address which points at a unique address in each of the cache associated memories 23 to 26. The IP generated address points to a unique set address that contains four directory addresses which identify four different blocks of memory. Thus, tag memory 23 serves as a lookup table for converting the IP generated cache set address into a true block address.

The IP generated cache set address also points at four bits and parity stored in the valid information memory 24 at the indicated set address. The information in memory 24 comprises confirmation type information that the information stored in the block addresses of tag memory 23 and cache memory 14 is valid information. When another IP or I/O processor writes into a memory location which is also in the IP cache, the block in the cache will be invalidated.

The set address further points at four bits and parity information in the degraded information memory 25 which verifies that the information stored in the blocks at the block addresses is not degraded.

Degraded information is generally referred to as information that contains one or more bit errors and can be caused by memory or other reasons. Detection of degraded information is described in U.S. Pat. Nos. 4,168,541 and 4,945,512 which are incorporated by reference herein.

The IP generated set address also points at five bits plus parity at an address in the most recently used information memory 26 that contains the aging information which will be explained in more detail hereinafter. For purposes of explanation of the present invention, the five bits of aging information stored in memory at memory location 27, pointed at by a set address, will be updated every time the instruction processor attempts reference to the cache memory 14.

Figure 3:
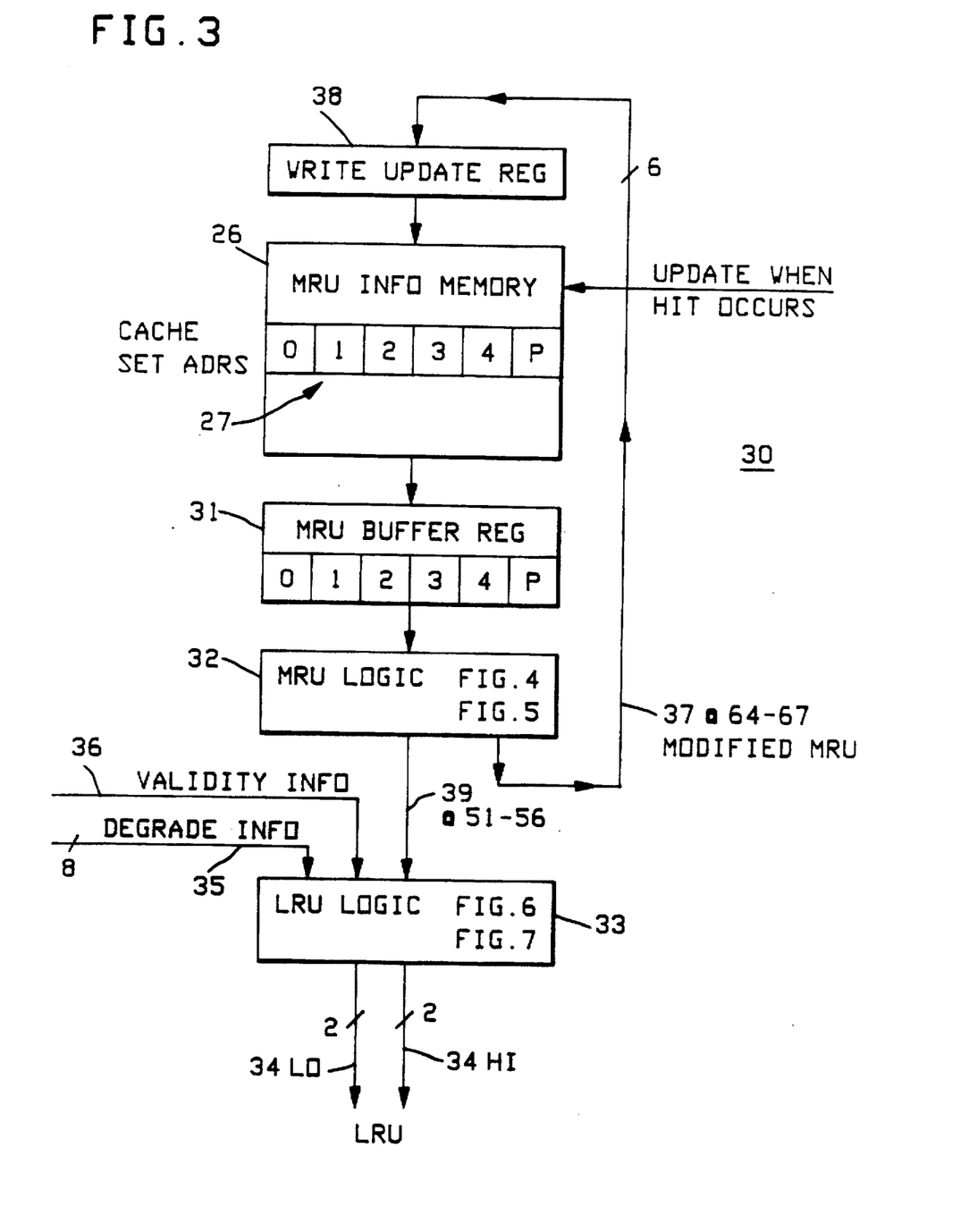
FIG. 3 is a schematic block diagram of the present invention cache associated logic circuitry which generates the least and most recently used (LRU/MRU) information of the present invention.

Refer now to FIG. 3 showing a schematic block diagram of the cache associated most recently used information memory 26 and its associated logic circuitry 30. When the instruction processor generates a cache associated address, the cache set address points at the MRU memory location 27 which as explained before is continuously updated. The first five bits of information in this memory location 27 contained five bits, zero to four of encoded information which will be explained in greater detail hereinafter. At the time the cache set address points at the MRU memory location 27, the information in this memory location 27 is copied into the MRU buffer register 31. The information in MRU buffer register 31 is available as a binary coded input to the MRU logic 32. The MRU logic 32 which will be explained in greater detail hereinafter generates modified most recently used information (MMRU) which is generated as a input to LRU logic 33 which automatically generates as two bit outputs the least recently used block of the four blocks of information addressed by the IP generated set address on line 34. In order to prevent any statistical misses, the LRU logic 33 is provided with the aforementioned valid information V0 to V3 stored in memory 24 on line 36, shown in valid information memory 24 of FIG. 2. Further, the degrade information D0 to D3 stored in memory 25 at the same cache set address is provided as an input on line 35. Thus, the LRU information on line 34 identifies the true least recently used block and the information necessary to prevent a miss because invalid information or degraded information is provided on line 35, 36 as an input to the LRU logic 33 along with the MRU logic information on line 39. The write update register 38 is updated via line 37 with five bits in MRU logic 32 at memory location 27 so that the next attempt of the instruction processor to address a memory location in its own cache memory 14 will be blocked if the block is invalid or the block is degraded. The information on line 37 contains the five bits to be stored in memory location 27 plus a parity bit, thus, line 37 is shown as having six parallel bits of modified MRU information. It will now be explained how the five bits to be stored in memory location 27 are generated.

Figure 4:
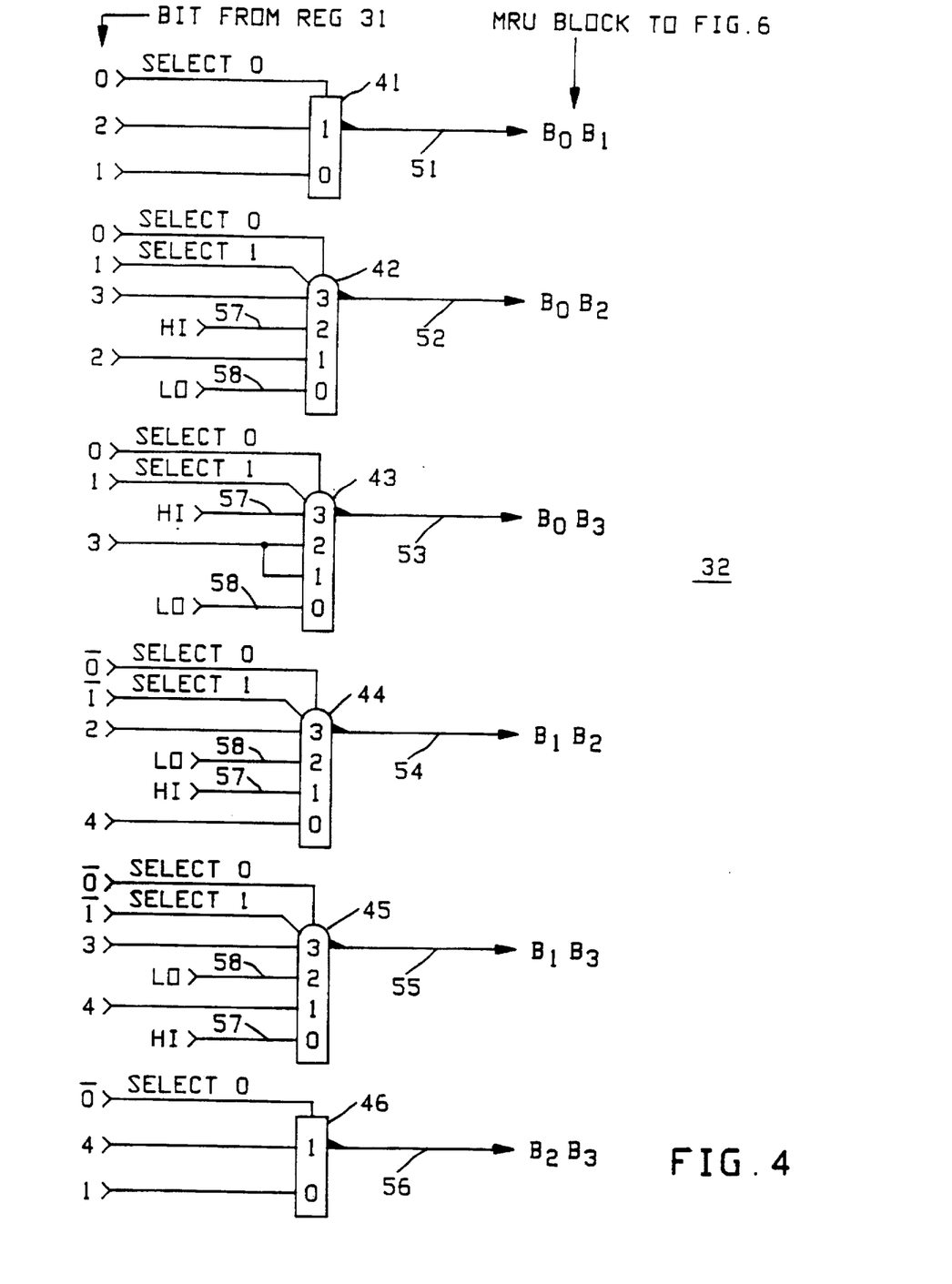
FIG. 4 and FIG. 5 are both detailed schematic logic circuit drawings of the MRU logic blocks shown in FIG. 3.
Figure 5:
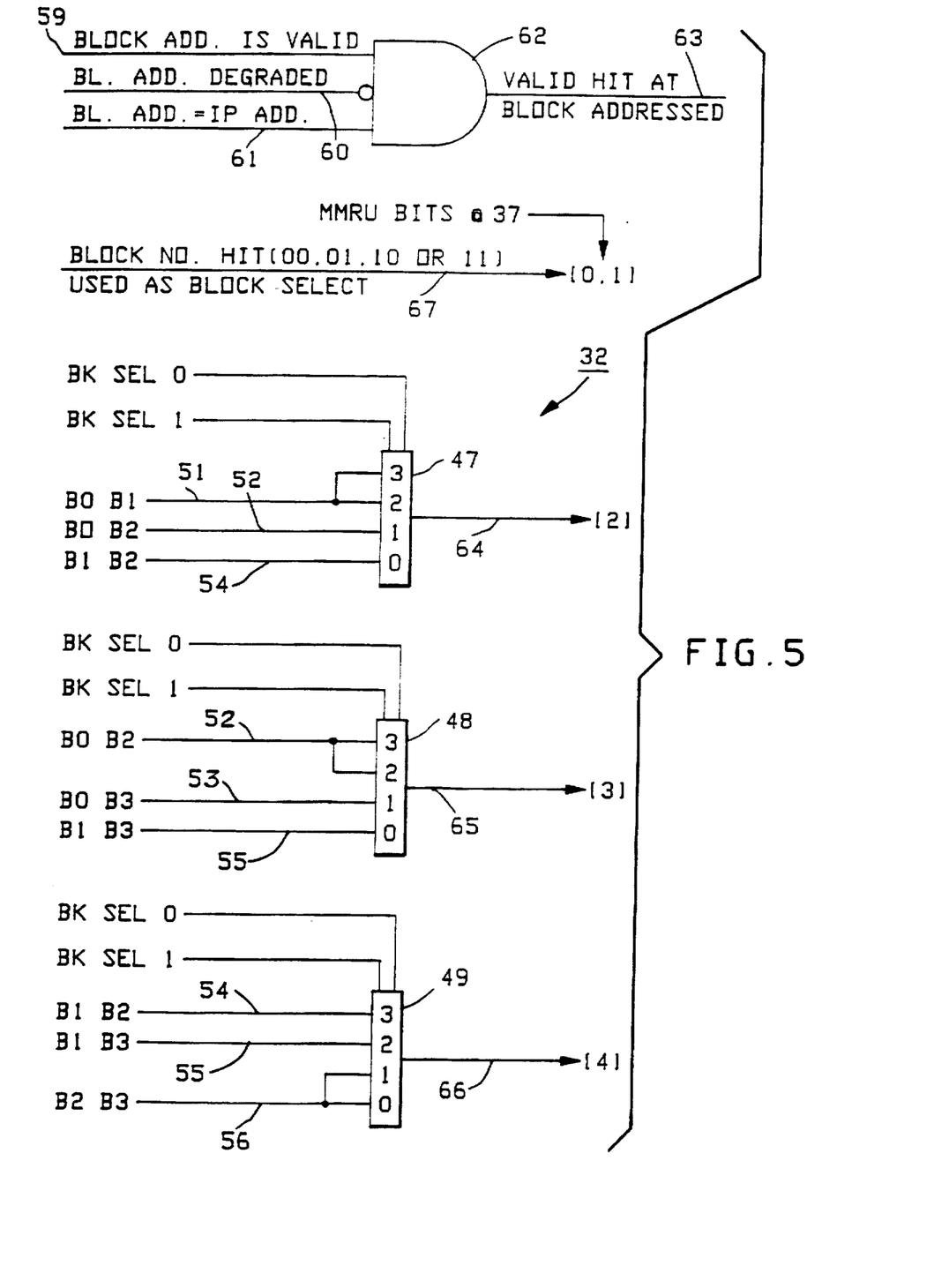

Refer now to FIGS. 4 and 5 which show a detailed schematic logic circuit of the most recently used (MRU) logic block 32. The inputs to logic block 32 of FIG. 4 are shown as the bits being generated by the MRU buffer register 31. These bits which are numbered zero to four are applied as inputs to the multiplexors 41 to 46 which are used to generate the block pair information shown as blocks B0B1 and B0B2 and B0B3 and B1B2 and B1B3 and B2B3 as the six possible combination of blocks of the four blocks in the cache memory 14. In order to generate the desired block pair information shown on lines 51 to 56, it is necessary that the muxes 41 to 46 be controlled by the bit information on the select control lines which enter the top of the muxes 41 to 46 while the data information is shown entering the muxes 41 to 46 on the left side to generate the desired output shown on lines 51 to 56 shown on the right side of the muxes. The logic performed by mux 41 under control of bit zero is to select the bit on the bit two line if bit zero is set, otherwise select bit one as the output for line 51. Similarly, mux 42 will select bit three if both bits zero and one are set. However, if bit zero is set and bit one is not set, then the mux 42 will select the high output on line 57 which is tied to a high condition. If bit one is set and bit zero is not set as a control condition, then bit two will be selected as the output for line 52. If the bit zero and bit one control lines are both zero, then the mux 42 will select the low condition on line 58 as the output condition for line 52.

There are three possible output conditions for line 53 presented by the three possible conditions of the control lines zero and one which may be both set, either zero or one set, and neither zero or one set. In which case, the mux 43 selects the conditions on lines 57, bit 3 and line 58 respectively.

There are four possible output conditions to mux 44 represented by both zero and one bits being not set or zero bit only not set or one bit only not set or zero and one bits set. These four conditions are represented on output line 54 by the inputs at bit two, line 58, line 57 and bit 4 respectively.

In similar manner the identical four control conditions applied as inputs to mux 45 will produce the respective outputs on line 55 produced by the respective inputs on bit 3, line 58, bit 4 and line 57 respectively.

The control line to mux 46 has only two possible conditions wherein bit zero is not set or set. When not set the bit four input to mux 46 is produced as an output on line 56 and if set, bit one is produced as an output on line 56. Having generated the outputs shown on line 51 to 56, they are now applied to muxes 47 to 49 which are shown in detail in FIG. 5.

Refer now FIG. 5 which shows a detailed schematic logic circuit of the MRU logic block 32 shown in FIG. 3. Before explaining the simple logic it will be understood that three conditions are employed to determine if a hit has occurred at any particular block address. The three conditions as shown on lines 59 to 61 are first that the block is valid and is identified in the information valid memory 24 shown applied to line 59. Second, that the block has not been degraded and there is no cache memory/TAG memory hardware problem, as indicated by the information in memory 25 shown in FIG. 2 and is shown on line 60 as an input to AND gate 62. Third, that the block address is the same as the IP address which is obtained by comparing the IP address and the block address in the tag memory 23 which condition is indicated on line 61. It will be noted that the degraded condition on line 60 is applied as a NOT condition to AND gate 62 to indicate a hit has occurred condition at the block being addressed on line 63. The signal on line 63 indicates that one of the four blocks zero to three is hit as a result of the instruction processor generating a memory address to the cache memory 14. The block binary designation on line 67 is applied as a block select control condition to the muxes 47 to 49 to select one of the inputs on lines 51 to 56 as an output on line 64 to 66 as shown in FIG. 5. For example, if block 3 is hit, then the selected input designated 3 of mux 47 (which is the B0B1 condition on line 51) is selected as the output for line 64. Line 37 (comprises lines 64 to 67) is an input to the write update register 38. Information on line 64 is stored in the bit 2 position of memory location 27 when the MRU memory location 27 is updated by writing the information in register 38 in memory 26. Similarly, if block two is hit, then the block two condition shown in mux 47 selects line 51 as before. If block one is hit, mux 47 selects the input on line 52 for the output on line 64. If block zero is hit, the input on line 54 is selected as the output on line 64 for writing into the memory location bit two position 27 of memory 26.

Mux 48 is shown having four possible block hit conditions zero to three which will select the inputs on line 55, 53, 52, or 52, respectively, as the output on line 65. Similarly, inputs to mux 49 on lines 56, 56, 55 and 54 will be selected for the condition shown for a hit on blocks zero to three to produce the output for bit four to update register 38 which is subsequently written into the memory location 27 of the MRU memory 26.

When a block 0 to 3 is hit it is encoded in binary format indicating the block that is hit on line 67 and the encoded information is recorded in the zero and one bit positions of memory location 27 via update register 38. A hit in block 0 would generate a binary 00 condition on line 67 to be recorded at bit locations 0 and 1 of memory location 27. Similarly, a hit in block 3 would generate a 11 condition on line 67 which is recorded in bit locations 0 and 1 of the memory location 27 and register 38. In the preferred mode of operation, the register 38 is also loaded with the information shown on output line 64 to 67 which is subsequently loaded into the memory location 27 of the MRU memory 26 when a hit condition occurs as a result of the instruction processor 11 attempting to reference a memory location in cache memory 14. If a hit does not occur, information shown on line 64 to 67 is not generated and is indicative of a don't care condition or an attempt to access the secondary level cache 18 or an attempt to access one of the MSU addresses in MSUs 21 or 22. In the latter two conditions, the IP waits for a new block of information to be brought into its cache memory 14. Once this new information is available, the IP may again attempt reference to the block which was previously missed. As a result of the new block of information being supplied to cache memory 14, the memory location 27 is updated. When the information in memory location 27 is updated with a new block, one of the previous blocks is replaced in the cache memory 14 and the block to be replaced is indicated by the LRU information on line 34. Stated differently, if the IP does not find the information required in cache memory 14, the information must be obtained from the second level cache 18 or from one of the MSUs 21, 22. Once the information is obtained from a second level cache 18 or an MSU 21, 22, the new block of information obtained must be written over the least recently used block in cache memory 14.

Figure 6:
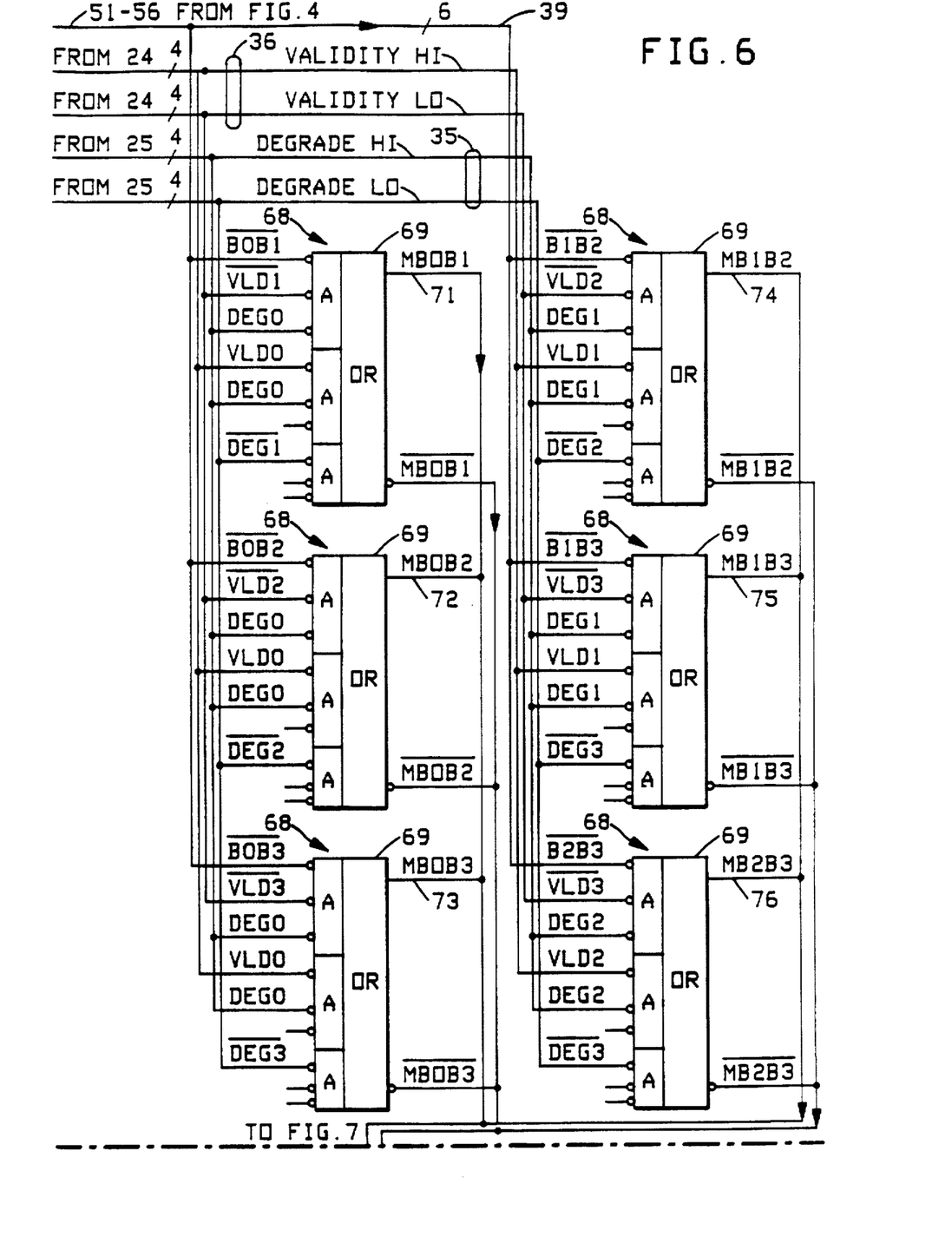
FIGS. 6 and 7 are both detailed schematic logic drawings of the LRU logic shown in FIG. 3 which produce the instruction processor machine usable encoded LRU information.
Figure 7:
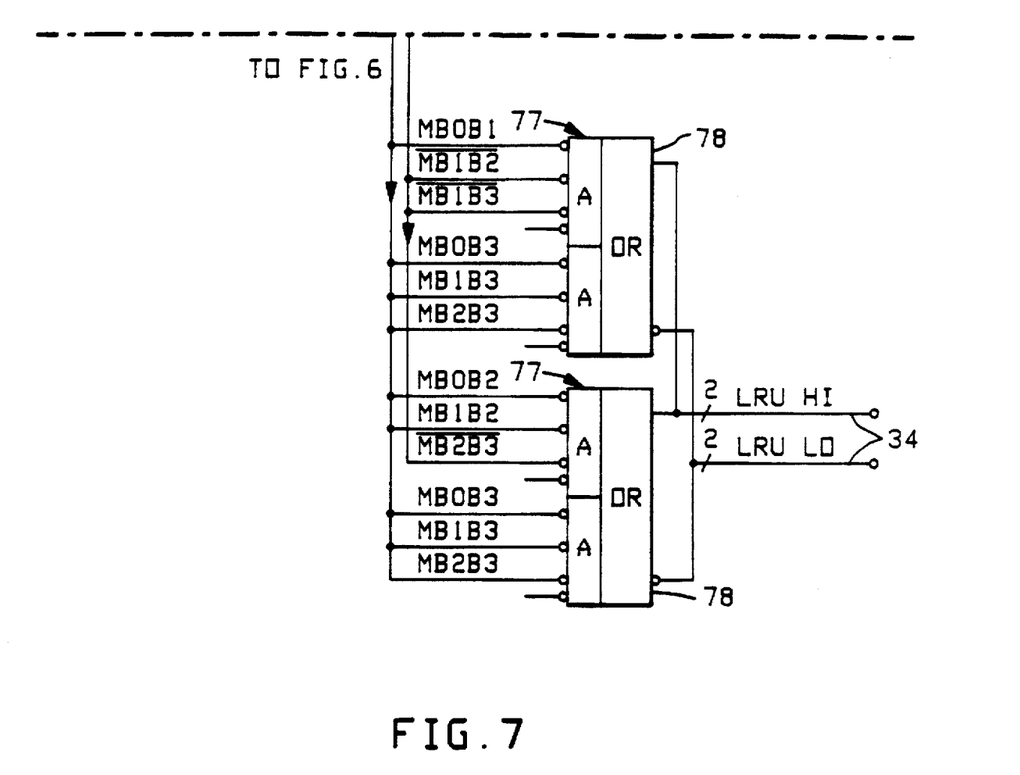

Refer now to FIGS. 6 and 7 showing a detailed schematic logic circuit drawing of the LRU logic block 33 shown in FIG. 3. The LRU logic block 33 takes the information shown as inputs on lines 35, 36 and 39 (lines 51–56) and produces the LRU information on line 34 as will now be explained. FIG. 6 shows the input lines 35 and 36 each having 4 bits. Four bits are from memory 24 and 25, and there are 4 complemented bits on lines 35 and 36. There are 6 bits on line 39 from lines 51 to 56. This input information is applied to gating logic circuitry comprising AND/OR logic 68,69 to produce the desired modified outputs shown as MB0B1 to MB2B3 on lines 71 to 76 respectively as shown in Table I which is self-explanatory. For example, to produce the output MB0B1 on line 71 the condition not degrade block zero ($\overline{D0}$) and validity block 1 (V1) and block pair B0B1 or not degrade block zero ($\overline{D0}$) and not valid block zero ($\overline{V0}$) or degrade block 1 (D1) will produce the high condition modified B0B1 (MB0B1) shown on line 71. The other conditions shown on lines 72 to 76 do not require a detailed explanation in view of the logic shown in Table 1. The outputs on lines 71 to 76 are employed as inputs to the AND/OR logic 77, 78 to produce the encoded LRU information. Ordinarily the LRU information would comprise only 2 bits for four blocks, but is shown as 4 bits to include a low LRU logic and a high LRU logic, all of which comprise the information on line 34 of FIG. 3.

TABLE 1

| |
| --- |
| MB0B1 = ($\overline{D0}$ · V1 · B0B1) + ($\overline{D0}$ · $\overline{V0}$) + D1 |
| MB0B2 = ($\overline{D0}$ · V2 · B0B2) + ($\overline{D0}$ · $\overline{V0}$) + D2 |
| MB0B3 = ($\overline{D0}$ · V3 · B0B3) + ($\overline{D0}$ · $\overline{V0}$) + D3 |
| MB1B2 = ($\overline{D1}$ · V2 · B1B2) + ($\overline{D1}$ · $\overline{V1}$) + D2 |
| MB1B3 = ($\overline{D1}$ · V3 · B1B3) + ($\overline{D1}$ · $\overline{V1}$) + D3 |
| MB2B3 = ($\overline{D2}$ · V3 · B2B3) + ($\overline{D2}$ · $\overline{V2}$) + D3 |

Having explained a preferred embodiment of the present invention, it will be understood that the IPs 11 and 12 do not supervise or perform the logic shown in FIGS. 4 to 7, thus, the logic which produces the LRU output on line 34 does not degrade the performance of the IPs. Similarly, the information which is stored in memory location 27 of the MRU memory 26 does not degrade the performance of the IPs 11 and 12.

In summary, it will be appreciated that when the IP references a memory location in cache 14 and obtains a hit, the information produced on line 34 is not required because no write over or rewrite occurs in the cache memory 14 when a hit occurs. However, as a result of the hit in memory 14 the aging information on line 37 will be updated in the write update register 38 which will be written into the memory location 27 using the aforementioned mode of operation read-modify-write which implies that the previous information in address location 27 is read through buffer 31 into the MRU logic block 32 where it is modified as an MMRU output on line 37 which is written as an input to write update register 38 which is rewritten and updated in the memory location 27.

What is claimed is:

1. A cache logic system for accessing a cache memory and for diagnosing errors in cache memory in a run mode, comprising:

a four block cache memory comprising a plurality of set associated block memories, an instruction processor (IP) for generating set associative addresses coupled to point to said set associated block memories for accessing information in said four block cache memory and said plurality of set associated block memories in the run mode, a cache associative logic circuit coupled to said four block cache memory for generating degrade information and validity information for the blocks of the four block cache memory at a set associative address generated by said instruction processor during said run mode, said cache associative logic circuit being coupled to a most recently used (MRU) memory for storing a modified most recently used (MMRU) block information for a set associated address after the IP has accessed said four block cache memory and said set associated block memories during said run mode, said cache associative logic circuit having MRU logic means coupled to said MRU memory for generating said modified most recently used block information after an IP hit occurs in said four block cache memory during said run mode, and LRU logic means coupled to said MRU logic means and to said plurality of set associated block memories for generating a least recently used (LRU) block code for the set associative address being accessed in said four block cache memory.

2. A cache logic system as set forth in claim 1 wherein said plurality of set associated block memories comprises a tag memory for accessing addresses of four blocks of information at said set associative address, storage controller means for fetching at least one block of information not stored in said four block cache memory when addressed by said IP, and wherein said LRU logic means comprises gating means for generating the least recently used (LRU) block of said four blocks of information at said set associative addresses.

3. A cache logic system as set forth in claim 2 wherein said storage controller means comprises means for writing said one block of information in said LRU block to enable said IP to accessed said fetched block without incurring a second miss.

4. A cache logic system as set forth in claim 1 wherein said MRU logic means comprises a five bit MRU buffer register for identifying six possible combinations of pairs of four blocks in said four blocks cache memory.

5. A cache logic system as set forth in claim 4 wherein said MRU logic means further includes a plurality of multiplexors, one for each of the possible combination of pairs of four blocks, coupled to said MRU buffer register for generating block pair information.

6. A cache logic system as set forth in claim 5 wherein said MRU logic means further includes gating means for generating from two bits of the five bits in the MRU buffer register information for identifying the block in MRU memory accesses by said IP.

7. A cache logic system as set forth in claim 6 wherein said MRU logic means further includes gate encoding means for modifying said block pair information stored in said MRU buffer register and for generating additional encoded bits for identifying a least recently used (LRU) block of.

8. A cache logic system as set forth in claim 4 wherein said LRU logic means comprises six AND/OR logic gates each having a first input indicative of one of said six possible combinations of pairs or blocks and second and third inputs indicative of the validity and degrade condition of each of the pairs of four block for generating modified block pairs indicative of non degraded valid block pairs.

9. A cache logic system as set forth in claim 8 which further includes two additional AND/OR logic gates coupled to outputs of said six AND/OR logic gates for generating a binary code indicative of the LRU block of said four block cache memory at one of said set associative addresses.

10. A method of avoiding double misses when accessing a cache memory of a main frame computer, comprising the steps of:

generating a cache set address at an instruction processor (IP) indicative of blocks of information in a cache memory, accessing a tag associative memory at said cache set address to generate a cache memory block address to be determined if the cache memory contains the address in memory being accessed by said instruction processor, accessing a degrade associative memory and a validity associative memory at said cache set address to generate degrade and validity information data in the cache memory at the address being accessed, reading from a (MRU) buffer register most recently used (MRU) memory binary information describing the most recently used block in memory at said cache set address, modifying said memory binary information read from said MRU buffer register to provide modified information, and writing the modified information into said (MRU) buffer register at the cache set address being accessed, and wherein said steps of reading, modifying and writing are performed by logic circuits while said IP is obtaining access to said cache memory at said cache set address.

11. A method as set forth in claim 10 which further includes the step of:

logically blocking the access of the IP to the cache memory address when said validity information is invalid and degraded information is degraded.

12. A method as set forth in claim 10 which further includes the step of:

logically generating coded bits indicating a least recently used (LRU) block of a plurality of blocks of information at said cache set address.

13. A method as set forth in claim 12 which further includes the step of:

fetching a block of information from an auxiliary memory and writing said information in said cache memory over said least recently used LRU block of information at said cache set address.

* * * * *